US012802312B2

(12) United States Patent
Zhao et al.

(10) Patent No.: US 12,802,312 B2
(45) Date of Patent: Nov. 17, 2026

(54) METHOD FOR IMAGE RECONSTRUCTION BASED ON MACHINE LEARNING, COMPUTER DEVICE AND STORAGE MEDIUM

(71) Applicant: SHANGHAI UNITED IMAGING HEALTHCARE CO., LTD., Shanghai (CN)

(72) Inventors: Li-Yi Zhao, Shanghai (CN); Jiao Tian, Shanghai (CN); Wei-Kang Zhang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 376 days.

(21) Appl. No.: 18/225,566

(22) Filed: Jul. 24, 2023

(65) Prior Publication Data

US 2024/0029324 A1 Jan. 25, 2024

(30) Foreign Application Priority Data

Jul. 22, 2022 (CN) ......................... 202210867277.9

(51) Int. Cl.
*G06T 12/10* (2026.01)
*G06T 12/30* (2026.01)

(52) U.S. Cl.
CPC .............. *G06T 12/10* (2026.01); *G06T 12/30* (2026.01); *G06T 2211/424* (2013.01)

(58) Field of Classification Search
CPC . G06T 11/005; G06T 11/008; G06T 2211/424
See application file for complete search history.

(56) References Cited

U.S. PATENT DOCUMENTS

| | | | |
|---|---|---|---|
| 6,507,633 | B1 | 1/2003 | Elbakri et al. |
| 9,478,048 | B2 | 10/2016 | Royalty et al. |
| 10,679,385 | B1 | 6/2020 | Yanoff et al. |
| 11,328,391 | B2 | 5/2022 | Li et al. |
| 2011/0262054 | A1 | 10/2011 | Benson et al. |
| 2011/0293158 | A1 | 12/2011 | Popescu |
| 2012/0207370 | A1 | 8/2012 | Fahimian et al. |

(Continued)

FOREIGN PATENT DOCUMENTS

| | | | |
|---|---|---|---|
| CN | 104166971 | B | 7/2015 |
| CN | 104821002 | A | 8/2015 |

(Continued)

OTHER PUBLICATIONS

International Search Report of PCT/CN2020/090861 mailed on Feb. 20, 2021, 4 pages.

(Continued)

*Primary Examiner* — Matthew C Bella
*Assistant Examiner* — Jinsu Hwang

(57) ABSTRACT

The present disclosure relates to a method for image reconstruction, which includes obtaining original scanning data of an object, obtaining an initial image and an initial motion vector field of the object, and determining a target reconstructed image of the object based on the original scanning data, the initial image and the initial motion vector field by a plurality of iterations. The iterative result of at least one of the iterations is obtained based on a machine learning model.

18 Claims, 3 Drawing Sheets

(56) References Cited

U.S. PATENT DOCUMENTS

| | | | |
|---|---|---|---|
| 2012/0263360 | A1 | 10/2012 | Zhu et al. |
| 2013/0002659 | A1 | 1/2013 | Jiang et al. |
| 2013/0101190 | A1 | 4/2013 | Shi et al. |
| 2013/0336561 | A1 | 12/2013 | Zamyatin et al. |
| 2013/0336562 | A1 | 12/2013 | Zamyatin et al. |
| 2014/0363067 | A1 | 12/2014 | Stayman et al. |
| 2015/0170341 | A1 | 6/2015 | Fan et al. |
| 2015/0221124 | A1 | 8/2015 | Noo et al. |
| 2016/0071245 | A1 | 3/2016 | Bergner et al. |
| 2017/0039706 | A1 | 2/2017 | Mikhno et al. |
| 2017/0294034 | A1 | 10/2017 | Zhou et al. |
| 2017/0311918 | A1 | 11/2017 | Qi et al. |
| 2018/0038969 | A1 | 2/2018 | McCollough et al. |
| 2018/0182133 | A1 | 6/2018 | Tanaka |
| 2018/0197317 | A1 | 7/2018 | Cheng et al. |
| 2018/0204305 | A1 | 7/2018 | Wang et al. |
| 2018/0247434 | A1 | 8/2018 | Qin |
| 2018/0336709 | A1 | 11/2018 | Persson |
| 2018/0338154 | A1 | 11/2018 | Huang et al. |
| 2019/0236763 | A1 | 8/2019 | Chan et al. |
| 2019/0251713 | A1 | 8/2019 | Chen et al. |
| 2019/0365341 | A1 | 12/2019 | Chan et al. |
| 2020/0027251 | A1 | 1/2020 | Demesmaeker et al. |
| 2020/0043204 | A1 | 2/2020 | Fu et al. |
| 2020/0242783 | A1* | 7/2020 | Lauritsch ................ G06T 7/246 |
| 2020/0311878 | A1 | 10/2020 | Matsuura et al. |
| 2021/0035339 | A1 | 2/2021 | Ahn et al. |
| 2021/0150779 | A1 | 5/2021 | Anastasio et al. |
| 2021/0290194 | A1 | 9/2021 | Bai et al. |
| 2021/0319600 | A1 | 10/2021 | Tao et al. |

FOREIGN PATENT DOCUMENTS

| | | | |
|---|---|---|---|
| CN | 105303589 | A | 2/2016 |
| CN | 106683144 | A | 5/2017 |
| CN | 108292428 | A | 7/2018 |
| CN | 109461192 | A | 3/2019 |
| CN | 109712213 | A | 5/2019 |
| CN | 110853742 | A | 2/2020 |
| WO | WO2018210648 | A1 | 11/2018 |
| WO | WO2019060843 | A1 | 3/2019 |
| WO | WO2021232195 | A1 | 11/2021 |
| WO | 2022096331 | A1 | 5/2022 |

OTHER PUBLICATIONS

Written Opinion in PCT/CN2020/090861 mailed on Feb. 20, 2021, 4 pages.

T. Y. Niu, X. Dong, M. Petrongolo, L. Zhu, "Iterative image-domain decomposition for dual-energy CT," Med Phys 41, pril 2014. (Year: 2014).

X. Dong, T. Y. Niu, L. Zhua, "Combined iterative reconstruction and image-domain decomposition for dual energy CT using total-variation regularization," Med Phys 41, May 2014(Year: 2014).

D. P. Clark, C. T. Badea, "Spectral diffusion: an algorithm for robust material decomposition of spectral CT data," Phys Med Biol 59,6445-6466, Oct. 2014. (Year: 2014).

Jing Wang and Xuejun, "Simultaneous motion estimation and image reconstruction (SMEIR) for 4D cone-beam CT", IEEE, Sep. 17, 2013 (11 pages).

Cosmin Bercea et al., "Confidence-Aware Levenberg-Marquardt Optimization for Joint Motion Estimation and Super-Resolution", CVPR, Sep. 6, 2016 (5 pages).

China Office action of CN202210867277.9 mailed Apr. 15, 2026.

* cited by examiner

METHOD FOR IMAGE RECONSTRUCTION BASED ON MACHINE LEARNING, COMPUTER DEVICE AND STORAGE MEDIUM

CROSS-REFERENCE TO RELATED APPLICATIONS

The present application claims the priority to Chinese Patent Application No. 202210867277.9, filed on Jul. 22, 2022, which is incorporated by reference herein in its entirety.

TECHNICAL FIELD

The disclosure relates to the technical field of computers, and particularly to a method for image reconstruction, a computer device, and a storage medium.

BACKGROUND

In the process of medical imaging scan of an object by a medical image scanning device, motion artifacts exist in the obtained medical image due to the autonomous or non-autonomous motion of the object. For example, in the process of medical imaging scan of the heart, the motion artifacts in the heart image reconstructed by the image scanning device based on the scanning data are caused due to the autonomous motion of the heart, so that the quality of the reconstructed heart image is poor, and the diagnosis of the image by a doctor can be affected in serious cases. At this point, motion artifacts must be removed during image reconstruction.

SUMMARY

In a second aspect, the present disclosure provides a method for image reconstruction. The method includes obtaining original scanning data of an object, obtaining an initial image and an initial motion vector field of the object, and determining a target reconstructed image of the object by a plurality of iterations based on the original scanning data, the initial image and the initial motion vector field, an iterative result of at least one of the plurality of iterations being obtained based on a machine learning model.

In some embodiments, the initial image includes an initial reconstructed image, and the initial reconstructed image and the initial motion vector field are determined based on the original scanning data. The determining the target reconstructed image of the object by a plurality of iterations based on the original scanning data, the initial image and the initial motion vector field includes determining the target reconstructed image of the object by the plurality of iterations based on the original scanning data, the initial reconstructed image and the initial motion vector field.

In some embodiments, the determining the target reconstructed image of the object by the plurality of iterations based on the original scanning data, the initial reconstructed image and the initial motion vector field includes performing the plurality of iterations on the initial reconstructed image and the initial motion vector field using energy functions until a preset iteration stop condition is met, the energy function corresponding to the at least one of the plurality of iterations being constructed based on the machine learning model, and determining the target reconstructed image of the object based on an iterated reconstructed image corresponding to a target iteration meeting the preset iteration stop condition.

In some embodiments, the plurality of iterations each include obtaining an iterated reconstructed image based on a starting reconstructed image and a starting motion vector field in a current iteration, and/or obtaining an iterated motion vector field based on a starting reconstructed image and a starting motion vector field in a current iteration.

In some embodiments, the plurality of iterations each include obtaining an iterated reconstructed image based on a starting reconstructed image and a starting motion vector field in a current iteration, and obtaining an iterated motion vector field based on the iterated reconstructed image and the starting motion vector field, or obtaining an iterated motion vector field based on a starting reconstructed image and a starting motion vector field in a current iteration, and obtaining an iterated reconstructed image based on the starting reconstructed image and the iterated motion vector field.

In some embodiments, the preset iteration stop condition includes a preset number of iterations and/or a preset threshold, the preset threshold being related to at least one of a quality of the reconstructed image, a quality variation amount of the reconstructed image, a quality of the motion vector field, a quality variation amount of the motion vector field, or a value of the energy function.

In some embodiments, the energy functions each include a data fidelity term and a regularization term, the energy function constructed based on the machine learning model comprising the regularization term based on the machine learning model and the data fidelity term.

In some embodiments, the data fidelity term is a correlation expression between the original scanning data and intermediate scanning data, the intermediate scanning data being generated by image processing of the initial reconstructed image or the iterated reconstructed image in each iteration based on the motion vector field, the image processing comprising image distortion processing and forward projection processing.

In some embodiments, the regularization term includes at least one of a regularization term for the initial reconstructed image or an iterated reconstructed image in the at least one iteration, a regularization term for the initial motion vector field or an iterated motion vector field in the at least one iteration, or a regularization term for the initial reconstructed image or the iterated reconstructed image in the at least one iteration and the corresponding motion vector field.

In some embodiments, the energy function is represented by the following equation:

$$E(U,M(\alpha))=\|Y-\mathrm{FP}(T(M)U)\|^2+R_1(U)+R_2(M(\alpha))+R_3(U,M(\alpha))$$

where $\|Y-\mathrm{FP}(T(M)U)\|^2$ is a data fidelity term of the energy function, $R_1(U)+R_2(M(\alpha))+R_3(U, M(\alpha))$ is a regularization term of the energy function, Y is an original scanning data of the object, U is an initial reconstructed image generated based on the original scanning data or the iterated reconstructed image in each iteration, $M(\alpha)$ is an initial motion vector field or the iterated motion vector field in each iteration, $\alpha$ is a parameter set for parameterizing the motion vector field, $R_1(U)$ is a regularization term for the reconstructed image, $R_2(M(\alpha))$ is a regularization term for the motion vector field, $R_3(U, M(\alpha))$ is a regularization term for the reconstructed image and the motion vector field, T(M) is an image warping operator based on the motion vector field, FP is a forward projection operator, and E is an energy function.

In some embodiments, the energy function is represented by the following equation:

$$E(U,M(\alpha))=\|Y-\mathrm{FP}(T(M)U)\|^2+DL_1(U)+DL_2(M(\alpha))+DL_3(U,M(\alpha))$$

where $\|Y-FP(T(M)U)\|^2$ is a data fidelity term of the energy function, $DL_1(U)$ is a regularization term for the reconstructed image based on the machine learning model, $DL_2(M(\alpha))$ is a regularization term for the motion vector field based on the machine learning model, $DL_3(U, M(\alpha))$ is a regularization term for the reconstructed image and the motion vector field based on the machine learning model.

In some embodiments, the target reconstructed image includes one of a CT image, an MR image, a PET image, and a PET-CT image.

In a second aspect, the present disclosure also provides a computer device, which includes a memory and a processor. The memory includes a computer program stored therein. The processor, when executing the computer program, performs a method for image reconstruction according to the first aspect of the present disclosure.

In a third aspect, the present disclosure also provides a non-transitory computer-readable storage medium having a computer program stored therein. The computer program, when executed by a processor, causes the processor to perform a method for image reconstruction according to the first aspect of the present disclosure.

The details of the various embodiments of the present disclosure will be illustrated with the accompanying drawings and description below, based on which, other features, problems to be solved, and beneficial effects of the disclosure will be readily understood by those skilled in the art.

BRIEF DESCRIPTION OF THE DRAWINGS

In order to better illustrate the embodiments of the present disclosure, a brief introduction will be made to the drawings that are required for describing the embodiments. It can be understood that the drawings described below are only to assist in describing some embodiments of the present invention, and not to limit the disclosure and the protection scope of the present disclosure.

DETAILED DESCRIPTION

In order to make the purposes, technical solutions, and advantages of the present disclosure clearer, the present disclosure will be described in detail in connection with the accompanying drawings and embodiments. It should be understood that the specific embodiments described herein are merely intended to explain the present disclosure and are not intended to limit the present disclosure.

The method for image reconstruction provided in the embodiments of the present disclosure may be applied to a medical image scanning device, or a computer device in communication connection with the medical image scanning device. The computer device may be a terminal or a server. It should be understood that, the method can also be applied to a medical imaging system including a medical imaging scanning device and a computer device in communication connection with the medical imaging scanning device. The medical image scanning device may be, but is not limited to, an electronic computed tomography (CT) device, a magnetic resonance imaging (MRI) device, a positron emission type computed tomography (PET) device, a PET-CT device, an image-guided radiation therapy device, etc. The device for image guiding of the image-guided radiation therapy device may be, but is not limited to, the above-mentioned medical image scanning device. The terminals may be, but are not limited to, various personal computers, laptops, tablets, etc. The server can be implemented as separate servers or a server cluster comprised of multiple servers.

An image reconstruction method known to the applicant is to perform iterative reconstruction of the original scanning data in the process of motion reconstruction based on the original scanning data, and synchronously iterate the motion vector field in the process of iteration, so as to obtain the reconstructed image without motion artifacts. However, this image reconstruction method has the problems of low image reconstruction efficiency and poor motion artifact removal effect, resulting in poor quality of reconstructed images.

Figure 1:
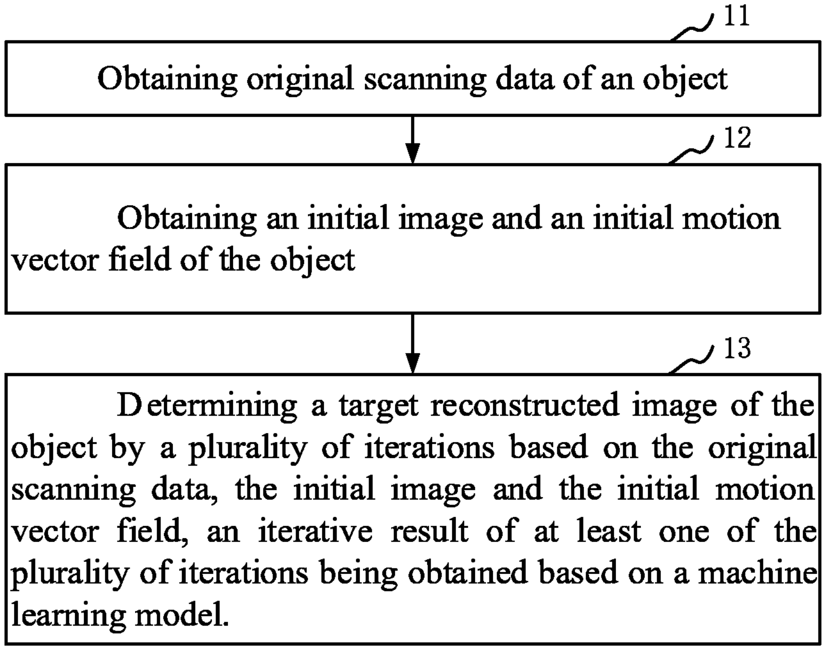
FIG. 1 is a flow chart of a method for image reconstruction according to an embodiment of the present disclosure.

In some embodiments, as shown in FIG. 1, a method for image reconstruction is provided. The method will be illustrated by taking the application of the method to the above-mentioned computer device as an example. It is to be noted that the method can also be applied to the aforementioned medical image scanning device or medical imaging system. The method includes the following steps 11-13.

In the step 11, original scanning data of an object is obtained.

In the step 12, an initial image and an initial motion vector field of the object are obtained.

In the step 13, a target reconstructed image of the object is determined by a plurality of iterations based on the original scanning data, the initial image and the initial motion vector field. An iterative result of at least one of the plurality of iterations is obtained based on a machine learning model.

The initial image may be a preset image or an initial reconstructed image determined based on the original scanning data. The initial motion vector field may be a preset motion field vector or an initial motion vector field determined based on the original scanning data. Utilizing the initial reconstructed image obtained from the original scanning data as the initial image for iteration, as well as utilizing the initial motion vector field obtained from the original scanning data for iteration, can enhance the efficiency of the iteration process.

Figure 2:
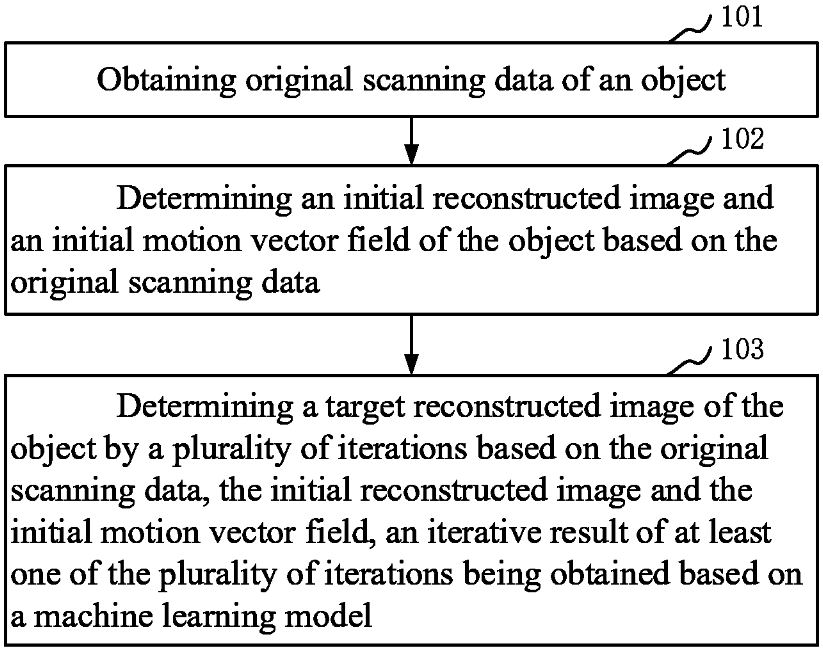
FIG. 2 is a flow chart of a method for image reconstruction according to an embodiment of the present disclosure.

Taking the embodiment where an initial reconstructed image and an initial motion vector field are determined based on the original scanning data as an example and referring to FIG. 2, the method for image reconstruction according to the embodiment includes the following steps 101-103.

In the step 101, the original scanning data of an object is obtained.

The original scanning data can be scanning data obtained by image scanning an object with a medical image scanning device. The scanning data is also called raw data in the art. Alternatively, the original scanning data can also be scanning data after preprocessing the scanned raw data. The preprocessing may be a calibration process for the scanning data, i.e., the original scanning data may be the calibrated scanning data. Alternatively, the calibration process may include, but is not limited to, a series of related calibration operations such as air calibration, hardening calibration, detector response calibration, HU (Hounsfield Unit) calibration, etc. In addition, the original scanning data can also be intensity domain data obtained by the image scanning of the object, or can also be calibrated original intensity domain data.

Exemplarily, in the case where the medical image scanning device is a CT scanning device, the original scanning data may be dual-energy scanning data collected after scanning the object by a dual-energy CT scanning device, or may be multi-energy spectrum scanning data collected after scanning the object by an energy spectrum CT scanning device.

Alternatively, the computer device may obtain the original scanning data of the object from the medical image scanning device, from a server in communication connection with the medical image scanning device, or from a local storage system of the computer device. The original scanning data of the object stored in the local storage system of the computer device may be obtained from the medical image scanning device or the server in communication connection with the medical image scanning device.

Furthermore, the computer device can obtain the original scanning data of the object from the above-mentioned devices based on the identification of the object. The identification of the object can be the identification information of the object, such as the ID, name, basic information, etc., which can uniquely distinguish different scanned objects. The identification information of objects is not limited in the present disclosure.

In the step 102, an initial reconstructed image and an initial motion vector field of the object are determined based on the original scanning data.

In some alternative embodiments, a preset reconstruction algorithm can be used to perform an image reconstruction based on the original scanning data to obtain an initial reconstructed image of the object. For example, the original scanning data of the object is input into the preset reconstruction algorithm, and the initial reconstructed image of the object is output. It should be noted that the preset image reconstruction algorithm used in the present embodiment may include an analytical reconstruction algorithm, an iterative reconstruction algorithm, a filtered back projection (FBP) reconstruction algorithm, etc., or may be an image reconstruction algorithm improved, optimized and/or transformed based on the above image reconstruction algorithm. Alternatively, the initial reconstructed image may include, but is not limited to, a CT image, an MR image, a PET image, a PET-CT image, etc.

In addition, the initial motion vector field of the object can be determined based on the initial reconstructed image of the object, which can be implemented using existing related techniques, and is not described in detail herein. It should be understood that, in order to improve the construction efficiency of the initial motion vector field, the initial motion vector field of the object can also be constructed based on preset parameters. For example, the initial motion vector field can be a zero matrix. It should be noted that the method for constructing the initial motion vector field of the object in the embodiments of the present disclosure is not particularly limited.

The motion vector field may describe various motions of a scanned object. For example, it can represent rigid motions such as organ translation, or deformation motions such as organ expansion or contraction.

In the step 103, a target reconstructed image of the object is determined by a plurality of iterations based on the original scanning data, the initial reconstructed image, and the initial motion vector field.

In some embodiments, the target reconstructed image and a target motion vector field of an object are determined by the plurality of iterations based on the original scanning data, the initial reconstructed image, and the initial motion vector field. The target motion vector field is the motion vector field corresponding to the target reconstructed image.

The iterative result of at least one of the plurality of iterations is obtained based on a machine learning model. Based on the machine learning model, the initial reconstructed image and/or the initial motion vector field are optimized to obtain the optimized reconstructed image and/or the optimized motion vector field.

Alternatively, through sequential iterations by one or more preset iteration models, the target reconstructed image of the object can be obtained based on the original scanning data, the initial reconstructed image, and the initial motion vector field. Among the one or more preset iteration models, the preset iteration model for the at least one of the plurality of iterations may be a machine learning model. For example, the machine learning model may be used for iterations at the beginning or at the end of the entire iteration process to optimize the reconstructed images and/or motion vector fields. For example, the first few iterations or the last few iterations in the plurality of iterations are based on a machine learning model. The machine learning model can also be used in the middle of the entire iteration process. Alternatively, at least one machine learning model may be used at the beginning and in the middle of the entire iteration process. Additionally, the plurality of iterations may involve multiple consecutive iterations based on a machine learning model, or the machine learning model may be used intermittently during the entire iteration process, which is not limited in the embodiments of the present disclosure.

Alternatively, when performing iteration with a machine learning model, a preset machine learning model can be used to optimize the reconstructed image and/or the motion vector field to obtain an optimized reconstructed image and/or an optimized motion vector field, thereby obtaining the target reconstructed image of the object. The target reconstructed image can be one of a CT image, an MR image, a PET image, and a PET-CT image. Exemplarily, when the original scanning data is CT scanning data, the initial reconstructed image is a CT image, and correspondingly, the target reconstructed image is also a CT image.

According to the method for image reconstruction, the original scanning data of the object is obtained, and the initial reconstructed image and the initial motion vector field of the object are determined based on the original scanning data. Then, based on the original scanning data, the initial reconstructed image and the initial motion vector field, a target reconstructed image of the object is determined by a plurality of iterations, and the iterative result of at least one of the plurality of iterations is obtained based on a machine learning model. That is to say, the method for image reconstruction provided in the embodiments combines the iteration with the machine learning model. Since the iteration based on the machine learning model contains a large number of learnable parameters and has strong reasoning capability, the quality of the iterated images and the iterated motion vector fields can be improved, i.e., the quality of the reconstructed image is improved, and the number of iterations is reduced. The learning efficiency is thus improved, i.e., the efficiency and accuracy of the iterations are improved, and the efficiency of image reconstruction is further improved. Also, the target motion vector field corresponding to the target reconstructed image can be obtained by the plurality of iterations, which is helpful for doctors to evaluate the image quality.

Figure 3:
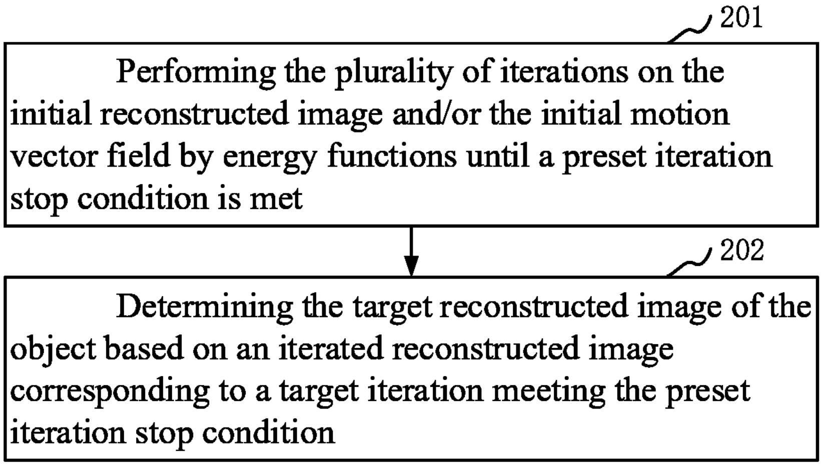
FIG. 3 is a flow chart of a method for image reconstruction according to another embodiment of the present disclosure.

FIG. 3 is a flow chart of a method for image reconstruction in another embodiment. This embodiment relates to an alternative implementation of a computer device determining a target reconstructed image of an object by a plurality of iterations based on original scanning data, an initial reconstructed image, and an initial motion vector field. Based on the above embodiments, as shown in FIG. 3, the above step 103 includes following steps 201 and 202.

In the step 201, the plurality of iterations are performed on the initial reconstructed image and/or the initial motion vector field using energy functions until a preset iteration stop condition is met.

An iteration indicates that an iterated reconstructed image and/or an iterated motion vector field are determined by an energy function based on a starting reconstructed image and/or a starting motion vector field of the current iteration. This energy function is related to the original scanning data, the starting reconstructed image, and the starting motion vector field. The energy function for at least one of the plurality of iterations is constructed based on a machine learning model.

Alternatively, when performing the iteration, an energy function may be constructed based on the original scanning data, the initial reconstructed image, and the initial motion vector field. The energy function includes a parameter term based on the original scanning data, a parameter term based on the initial reconstructed image, and a parameter term based on the initial motion vector field. During an iteration, the parameter term based on the initial reconstructed image and the parameter term based on the initial motion vector field are replaced by an optimized reconstructed image and an optimized motion vector field, respectively. In other words, during each iteration, the parameter term related to the reconstructed image in the energy function is constructed based on a previous optimized reconstructed image, and the parameter term related to the motion vector field is constructed based on a previous optimized motion vector field.

Alternatively, the energy function may include a data fidelity term and a regularization term. The data fidelity term includes a correlation expression between the original scanning data and intermediate scanning data. The intermediate scanning data is the scanning data generated by image processing of the reconstructed image based on the motion vector field. Alternatively, the image processing may include image distortion processing and forward projection processing. Additionally, the regularization term may include at least one of a regularization term for a reconstructed image, a regularization term for a motion vector field, or a regularization term for both a reconstructed image and a motion vector field. The reconstructed image is the initial reconstructed image or an iterated reconstructed image in each iteration, and the motion vector field is the initial motion vector field or an iterated motion vector field in each iteration.

That is, in the first iteration, the reconstructed image is the initial reconstructed image, the motion vector field is the initial motion vector field, and the regularization term of the energy function may include at least one of a regularization term for the initial reconstructed image, a regularization term for the initial motion vector field, and a regularization term for both the initial reconstructed image and the initial motion vector field. In each subsequent iteration, the reconstructed image is an iterated reconstructed image in each iteration, the motion vector field is an iterated motion vector field in each iteration, and the regularization term of the energy function may include at least one of a regularization term for the iterated reconstructed image, a regularization term for the iterated motion vector field, and a regularization term for both the iterated reconstructed image and the iterated motion vector field. It should be noted that a starting reconstructed image in each iteration is the optimized reconstructed image obtained by the previous iteration, and a starting motion vector field in each iteration is the optimized motion vector field obtained by the previous iteration. It should be noted that the regularization terms in the energy functions can be the same or different for different iterations.

Further, in the iteration based on the machine learning model, the energy function may be constructed based on the machine learning model. In some embodiments, the data fidelity term and/or regularization term in the energy function may be constructed based on the machine learning model. Exemplarily, the energy function constructed based on the machine learning model may include a data fidelity term and a regularization term based on the machine learning model.

In other words, the iteration based on the machine learning model may determine an iterated reconstructed image and/or an iterated motion vector field by the energy function of the current iteration based on a starting reconstructed image and/or a starting motion vector field of the current iteration. The energy function of the current iteration includes a data fidelity term and a regularization term based on the machine learning model. The regularization term based on the machine learning model may include at least one of a regularization term for the reconstructed image based on the machine learning model, a regularization term for the motion vector field based on the machine learning model, or a regularization term for the reconstructed image and the motion vector field based on the machine learning model. As an exemplary example, all of the regularization term for the reconstructed image, the regularization term for the motion vector field, and the regularization term for the reconstructed image and the motion vector field are based on the machine learning model. As another exemplary example, only the regularization term for the reconstructed image based on the machine learning model is based on the machine learning model.

Exemplarily, the energy function can be represented by equation (1).

$$E(U,M(\alpha))=\|Y-\mathrm{FP}(T(M)U)\|^2+R_1(U)+R_2(M(\alpha))+R_3(U,M(\alpha)) \tag{1}$$

where $\|Y-FP(T(M)U)\|^2$ is a data fidelity term of the energy function, $R_1(U)+R_2(M(\alpha))+R_3(U, M(\alpha))$ is a regularization term of the energy function, Y is an original scanning data of the object, U is an initial reconstructed image generated based on the original scanning data or the iterated reconstructed image in each iteration, $M(\alpha)$ is an initial motion vector field or the iterated motion vector field in each iteration, a is a parameter set for parameterizing the motion vector field, $R_1(U)$ is a regularization term for the reconstructed image, $R_2(M(\alpha))$ is a regularization term for the motion vector field, $R_3(U, M(\alpha))$ is a regularization term for the reconstructed image and the motion vector field, T(M) is an image warping operator based on the motion vector field, FP is a forward projection operator, i.e., an operator configured for performing a forward projection calculation to convert the image data type to a raw data type, and E is an energy function.

It should be noted that the parameterization of the motion vector field can be achieved by using an interpolation algorithm based on the cubic b-spline to parameterize the parameter set $\alpha$ to obtain the motion vector field $M(\alpha)$. It should be understood that other existing parametric methods, such as other interpolation algorithms, may also be used, which are not limited in the embodiments of the present disclosure.

Further, in each iteration, an optimized iterated reconstructed image is obtained by optimizing the starting reconstructed image of the current iteration by the energy function, and/or an optimized iterated motion vector field is obtained by optimizing the starting motion vector field of the current iteration by the energy function. It should be noted that the starting reconstructed image of the current iteration is the optimized iterated reconstructed image obtained by the previous iteration, and the starting motion vector field of the current iteration is the optimized iterated motion vector field obtained by the previous iteration.

Alternatively, when performing an iterative optimization, simultaneous or alternate optimization may be used. Simultaneous optimization means that during one iteration, the reconstructed image and motion vector field are optimized at the same time. In other words, during one iteration, the optimized iterated reconstructed image is obtained by optimizing the starting reconstructed image of the current iteration by the energy function, and meanwhile, the optimized iterated motion vector field is obtained by optimizing the starting motion vector field of the current iteration by the energy function. Alternate optimization means that during one iteration, either the reconstructed image is optimized or the motion vector field is optimized. In other words, during one iteration, the optimized iterated reconstructed image is obtained by optimizing the starting reconstructed image of the current iteration by the energy function, or the optimized iterated motion vector field is obtained by optimizing the starting motion vector field of the current iteration by the energy function.

It should be noted that only one type of optimization (i.e., simultaneous or alternate optimization) can be used throughout the iteration. Alternatively, both the simultaneous optimization and the alternate optimization can be used. In addition, for the alternate optimization, a single alternation of the reconstructed image and the motion vector field can be performed, i.e., the reconstructed image is optimized once and then the motion vector field is optimized once. Alternatively, multiple alternations of the reconstructed image and the motion vector field can be performed, i.e., the reconstructed image is optimized continuously for multiple times and then the motion vector field is optimized continuously for multiple times. The implementation of alternate optimization is not limited in the embodiments of the present disclosure. Further, the order in which the reconstructed image and the motion vector field are optimized is also not limited in the embodiments of the present disclosure.

Alternatively, when the reconstructed image and the motion vector field are optimized by the energy function, a gradient descent algorithm or a Newton algorithm can be used for optimization. It should be understood that, other optimization algorithms can also be used to optimize the reconstructed image and motion vector field. The specific implementation of the optimization is not limited in the embodiments of the present disclosure.

Exemplarily, in the case where the simultaneous optimization is used, obtaining an iterated reconstructed image and an iterated motion vector field based on the starting reconstructed image and the starting motion vector field of the current iteration includes the following three cases.

The first case is obtaining the iterated reconstructed image and the iterated motion vector field based on the starting reconstructed image and the starting motion vector field of the current iteration.

Exemplarily, based on the above equation (1), the optimization for the iterated reconstructed image and the iterated motion vector field includes the following steps.

Firstly, an intermediate reconstructed image and an intermediate motion vector field are obtained by equation (2).

$$\begin{cases} \overline{U_{t+1}} = U_t - \dfrac{\nabla_U L(U_t, M(\alpha_t))}{H_U L(U_t, M(\alpha_t))} \\ \overline{\alpha_{t+1}} = \alpha_t - \dfrac{\nabla_\alpha L(U_t, M(\alpha_t))}{H_\alpha L(U_t, M(\alpha_t))} \end{cases} \quad (2)$$

where $U_t$ is a starting reconstructed image of the current iteration, $\overline{U_{t+1}}$ is an intermediate reconstructed image, $\alpha_t$ is a parameter set for a starting motion vector field of the current iteration, $\overline{\alpha_{t+1}}$ is a parameter set for the intermediate motion vector field, $\nabla_U L$ is a first-order partial derivative of a data fidelity term L with respect to U in an energy function E, and is also a gradient matrix of the reconstructed image U, $H_U L$ is a second-order partial derivative of the data fidelity term L with respect to U in the energy function E, and is also a Hessian matrix of the reconstructed image U, $\nabla_\alpha L$ is a first-order partial derivative of the data fidelity term L with respect to $\alpha$ in the energy function E, and is also a gradient matrix of the parameter set $\alpha$, and $H_\alpha L$ is a second-order partial derivative of the data fidelity term L with respect to $\alpha$ in the energy function E, and is also a Hessian matrix of the parameter set $\alpha$. After obtaining the parameter set $\alpha_{t+1}$, the iterated motion vector field $M(\alpha+1)$ can be obtained.

Then, the regularization term is used to regularize the intermediate reconstructed image and the intermediate motion vector field to obtain the iterated reconstructed image $U_{t+1}$ and the iterated motion vector field $\alpha_{t+1}$. Alternatively, the iterated reconstructed image $U_{t+1}$ can be obtained by $R_1(\overline{U_{t+1}})$ and the iterated motion vector field $\alpha_{t+1}$ can be obtained by $R_2(M(\overline{\alpha_{t+1}}))$.

In addition, in this case, the energy function used to obtain the iterated reconstructed image and the energy function used to obtain the iterated motion vector field are both energy functions constructed based on the starting reconstructed image and the starting motion vector field of the current iteration.

The second case is obtaining an iterated reconstructed image based on the starting reconstructed image and the starting motion vector field of the current iteration, and obtaining an iterated motion vector field based on the iterated reconstructed image and the starting motion vector field.

Exemplarily, based on the above equation (1), the optimization for the iterated reconstructed image and the iterated motion vector field includes the following steps.

Firstly, an intermediate reconstructed image is obtained by equation (3).

$$\overline{U_{t+1}} = U_t - \frac{\nabla_U L(U_t, M(\alpha_t))}{H_U L(U_t, M(\alpha_t))} \quad (3)$$

where each parameter in the equation (3) can be understood by referring to the corresponding parameter in the above equation (1), and is not repeated here.

Then, the regularization term is used to regularize the intermediate reconstructed image to obtain the iterated reconstructed image $U_{t+1}$, and after that, the iterated reconstructed image $U_{t+1}$ is input into equation (4) to obtain the intermediate motion vector field.

$$\overline{\alpha_{t+1}} = \alpha_t - \frac{\nabla_\alpha L(U_t, M(\alpha_t))}{H_\alpha L(U_t, M(\alpha_t))} \quad (4)$$

After that, the regularization term is used to regularize the intermediate motion vector field to obtain the iterated motion vector field $\alpha_{t+1}$.

In addition, in this case, the energy function for obtaining the iterated reconstructed image is the energy function constructed based on the starting reconstructed image and the starting motion vector field of the current iteration, and the energy function for obtaining the iterated motion vector field is the energy function constructed based on the optimized iterated reconstructed image obtained by the current iteration and the starting motion vector field of the current iteration.

The third case is obtaining the iterated motion vector field based on the starting reconstructed image and the starting motion vector field of the current iteration, and obtaining the iterated reconstructed image based on the starting reconstructed image of the current iteration and the iterated motion vector field.

Exemplarily, based on the above equation (1), the optimization for the iterated reconstructed image and the iterated motion vector field includes the following steps.

Firstly, an intermediate motion vector field is obtained by equation (5).

$$\overline{\alpha_{t+1}} = \alpha_t - \frac{\nabla_\alpha L(U_t, M(\alpha_t))}{H_\alpha L(U_t, M(\alpha_t))} \quad (5)$$

where each parameter in the equation (5) can be understood by referring to the corresponding parameter in the above equation (1), and is not repeated here.

Then, the regularization term is used to regularize the intermediate motion vector field to obtain the iterated motion vector field $\alpha_{t+1}$, and after that, the iterated motion vector field $\alpha_{t+1}$ is input into equation (6) to obtain the intermediate reconstructed image.

$$\overline{U_{t+1}} = U_t - \frac{\nabla_U L(U_t, M(\alpha_t))}{H_U L(U_t, M(\alpha_t))} \quad (6)$$

After that, the regularization term is used to regularize the intermediate reconstructed image to obtain the iterated reconstructed image $U_{t+1}$.

In addition, in this case, the energy function used to obtain the iterated motion vector field is an energy function constructed based on the starting reconstructed image and the starting motion vector field of the current iteration, and the energy function used to obtain the iterated reconstructed image is an energy function constructed based on the starting reconstructed image of the current iteration and the optimized iterated motion vector field obtained by the current iteration.

Exemplarily, in the case where the alternate optimization is used, obtaining the iterated reconstructed image or the iterated motion vector field based on the starting reconstructed image or the starting motion vector field of a current iteration includes the following steps.

The iterated reconstructed image is obtained based on the starting reconstructed image and the starting motion vector field of the current iteration, or an iterated motion vector field is obtained based on the starting reconstructed image and the starting motion vector field of the current iteration. The calculation equations can be obtained by referring to the above equations (3)-(6).

Assuming that the t-th iteration is an optimization of the reconstructed image, the starting reconstructed image of the t-th iteration is $U_t$ and the starting motion vector field is $\alpha_t$, then the optimized iterated reconstructed image obtained by the t-th iteration is:

$$U_{t+1} = R_1(\overline{U_{t+1}}),\ \overline{U_{t+1}} = U_t - \frac{\nabla_U L(U_t, M(\alpha_t))}{H_U L(U_t, M(\alpha_t))}$$

Then, assuming that the (t+1)-th iteration is the optimization of the motion vector field, the starting reconstructed image of the (t+1)-th iteration is $U_{t+1}$, and the starting motion vector field of the (t+1)-th iteration is $\alpha_t$, then the optimized iterated motion vector field obtained by the (t+1)-th iteration is:

$$\alpha_{t+1} = R_2(M(\overline{\alpha_{t+1}})),\ \overline{\alpha_{t+1}} = \alpha_t - \frac{\nabla_\alpha L(U_t, M(\alpha_t))}{H_\alpha L(U_t, M(\alpha_t))}$$

Assuming that the (t+2)-th iteration is the optimization of the reconstructed image, the starting reconstructed image of the (t+2)-th iteration is $U_{t+1}$ and the starting motion vector field of the (t+2)-th iteration is $\alpha_{t+1}$, then the optimized iterated reconstructed image obtained by the (t+2)-th iteration is:

$$U_{t+2} = R_1(\overline{U_{t+2}}),\ \overline{U_{t+2}} = U_{t+1} - \frac{\nabla_U L(U_{t+1}, M(\alpha_{t+1}))}{H_U L(U_{t+1}, M(\alpha_{t+1}))}$$

Assuming that the (t+3)-th iteration is the optimization of the motion vector field, the starting reconstructed image of the (t+3)-th iteration is $U_{t+2}$ and the starting motion vector field of the (t+3)-th iteration is $\alpha_{t+1}$, then the optimized iterated motion vector field obtained by the (t+3)-th iteration is:

$$\alpha_{t+2} = R_2(M(\overline{\alpha_{t+2}})),\ \overline{\alpha_{t+1}} = \alpha_{t+1} - \frac{\nabla_\alpha L(U_{t+2}, M(\alpha_{t+1}))}{H_\alpha L(U_{t+2}, M(\alpha_{t+1}))}$$

More iteration results can be obtained by referring to the above.

Alternatively, in the t-th iteration, while regularizing the intermediate reconstructed image $\overline{U_{t+1}}$ to obtain the iterated reconstructed image $U_{t+1}$, the starting motion vector field $\alpha_t$ can also be regularized to obtain the motion vector field $\alpha_t'$. Then, in the (t+1)-th iteration, the starting motion vector field of the (t+1)-th iteration is $\alpha_t'$, and the optimized iterated motion vector field obtained by the (t+1)-th iteration is:

$$\alpha_{t+1} = R_2(M(\overline{\alpha_{t+1}})),\ \overline{\alpha_{t+1}} = \alpha_t' - \frac{\nabla_\alpha L(U_{t+1}, M(\alpha_t'))}{H_\alpha L(U_{t+1}, M(\alpha_t'))}$$

Finally, it should be noted that the energy function constructed based on the machine learning model can be represented by equation (7).

$$E(U,M(\alpha))=\|Y-FP(T(M)U)\|^2+DL_1(U)+DL_2(M(\alpha))+DL_3(U,M(\alpha)) \quad (7)$$

where $DL_1(U)$ is the regularization term of the reconstructed image based on the machine learning model, $DL_2(M(\alpha))$ is the regularization term of the motion vector field based on the machine learning model, and $DL_3(U,M(\alpha))$ is the regularization term of the reconstructed image and the motion vector field based on the machine learning model.

Thus, in the above regularization, the iterated reconstructed image $U_{t+1}$ can be obtained based on $DL_1(\overline{U_{t+1}})$, and the iterated motion vector field $\alpha_{t+1}$ can be obtained based on $DL_2(M(\overline{\alpha_{t+1}}))$. For the detailed iteration process, reference can be made to the relevant descriptions of the above cases, and it is not repeated here.

In the step 202, a target reconstructed image of the object is determined based on an iterated reconstructed image corresponding to a target iteration meeting the preset iteration stop condition.

In some embodiments, the preset iteration stop condition may include a preset number of iterations and/or a preset threshold. The preset threshold may be related to at least one of a quality of the reconstructed image, a quality variation amount of the reconstructed image, a quality of the motion vector field, a quality variation amount of the motion vector field, and a value of an energy function. That is, when performing an iterative optimization, the iteration process can be stopped if the preset number of iterations is met. The iteration process can also be stopped if the preset thresholds is met. Alternatively, the iteration process can be stopped if both the preset number of iterations and the preset threshold are met. It should be noted that the preset iteration stop condition may also include a certain function value of the energy function being less than or greater than a threshold, for example, a certain function value of the energy function such as a value of a gradient or a Hessen matrix being less than or greater than a threshold. It should be understood that, other conditions may also be included. The stop conditions are not limited in the embodiments of the present invention.

Alternatively, if the preset iteration stop condition is met, the iteration process stops, and the target reconstructed image of the object can be determined based on the iterated reconstructed image corresponding to the target iteration meeting the preset iteration stop condition. The target iteration may be the last iteration. Alternatively, the iterated reconstructed image corresponding to the target iteration can be directly taken as the target reconstructed image of the object. The target reconstructed image of the object can also be determined based on the iterated reconstructed image corresponding to the target iteration and at least one iterated reconstructed image in the iterative process. Exemplarily, the iterated reconstructed image corresponding to the target iteration and at least one iterated reconstructed image in the iteration process may be combined to obtain the target reconstructed image of the object. Alternatively, the combination process may include, but is not limited to, linear overlay, region substitution, etc. An image processing can also be performed on the iterated reconstructed image corresponding to the target iteration, and the reconstructed image obtained after the image processing is taken as the target reconstructed image of the object. It should be understood that, the target reconstructed image of the object can also be determined based on the iterated reconstructed image corresponding to the target iteration and the initial reconstructed image. The determination of the target reconstructed image as set forth above is not limited in the embodiments of the present disclosure.

In this embodiment, an energy function relating to the original scanned data, the initial reconstructed image and the initial motion vector field is constructed, and a plurality of iterations are performed on the initial reconstructed image and/or the initial motion vector field by the energy function until a preset iteration stop condition is met. Further, the target reconstructed image of the object is determined based on the iterated reconstructed image corresponding to a target iteration that meets the preset iteration stop condition. An iteration indicates that an iterated reconstructed image and/or an iterated motion vector field are determined by an energy function based on a starting reconstructed image and/or a starting motion vector field of the current iteration. The iteration method provided in this embodiment can thus improve the efficiency and accuracy of the iteration and improve the accuracy of image reconstruction.

In an alternative embodiment of the present disclosure, the original scanning data may be multi-energy spectrum CT scanning data, and correspondingly, the initial reconstructed image may be a base material decomposition image. Different base material decomposition images can be reconstructed according to different reconstruction parameters. For example, different base material decomposition images can be reconstructed according to different decomposition coefficients and different water-iodine ratios. Exemplarily, the iodine map in the base material decomposition image may display only the contrast agent, which is advantageous for eliminating the impact of calcification/plaque on the judgment of coronary stenosis of the heart.

Alternatively, the initial reconstructed image may include a plurality of base material decomposition images, and correspondingly, the optimized target reconstructed image obtained by the iterative optimization may be reconstructed images corresponding to different base material decomposition images.

Exemplarily, the energy function described above may also be represented by equation (8).

$$E(U_1, \ldots, U_L, M(\alpha))=\Sigma_n\|\Sigma_l\int dE S_n(E)\exp[-FP(T(M)U_l)\mu_l(E)]-Y_n\|^2+R_1(U_1, \ldots, U_L)+R_2(M(\alpha))+R_3(U_1, \ldots, U_L, M(\alpha)) \quad (8)$$

where $U_l$ is the initial reconstructed image (i.e., initial base material decomposition image) or iterated reconstructed image (i.e., iterated base material decomposition image), l is an index of base material taken from 1 to L, L is the total number of indexes of base material, $Y_n$ is the original scanning data of the object (e.g., multi-energy spectrum CT scanning data), n is an index of energy bin taken from 1 to N, N is the total number of indexes of energy bin, E is the X-ray energy, $S_n(E)$ is the spherical tube X-ray energy spectrum information or detector response information, $\mu_l(E)$ is the energy spectrum absorption rate of the base material, $R_1(U_1, \ldots, U_L)$ are regularization terms for the base material decomposition images respectively, including the regularization term based on machine learning (or deep learning), $R_2(M(\alpha))$ are regularization terms for the motion vectors of the base material respectively, $R_3(U_1, \ldots, U_L, M(\alpha))$ are regularization terms for base material decomposition images and motion vector fields respectively, including regularization terms based on machine learning (or deep learning).

Alternatively, the parameterization of the motion vector field can be achieved by using an interpolation algorithm based on the cubic b-spline to parameterize the parameter set a to obtain the motion vector field $M(\alpha)$. It should be understood that, other existing parametric methods, such as other interpolation algorithms, may also be used, which are not limited by the embodiments of the present disclosure.

Further, when performing iterative optimizations on the initial reconstructed image and/or the initial motion vector field by the energy function of the above equation (8), reference can be made to the iteration methods discussed above, and the simultaneous optimization and/or the alternate optimization may be used, which is not discussed in detail herein.

Exemplarily, iterative optimization may be implemented by the alternate optimization so that the energy function continues to decrease until convergence. The optimization indicated in the following equation (9) can be used for alternately optimizing the reconstructed image and the motion vector field.

$$\begin{cases} U_{l;t+1} = DL_1(\overline{U_{l;t+1}}) \\ \alpha_{t+1} = DL_2(M(\overline{\alpha_{t+1}})) \end{cases}, \tag{9}$$

$$\begin{cases} \overline{U_{l;t+1}} = U_{l;t} - \dfrac{\nabla_U L(U_{1;t}, \ldots, U_{l;t}, \ldots, U_{L;t}, M(\alpha_t))}{H_U L(U_{1;t}, \ldots, U_{l;t}, \ldots, U_{L;t}, M(\alpha_t))} \\ \overline{\alpha_{t+1}} = \alpha_t - \dfrac{\nabla_\alpha L(U_{1;t+1}, \ldots, U_{L;t+1}, M(\alpha_t))}{H_\alpha L(U_{1;t+1}, \ldots, U_{L;t+1}, M(\alpha_t))} \end{cases}$$

When performing alternate optimization, for the current iteration, each starting base material decomposition image can be optimized according to the equation of $U_{l;\ t+1}$ to obtain the optimized iterated base material decomposition image corresponding to each starting base material decomposition image. Then, when the next iteration is performed, the starting motion vector field can be optimized according to the equation of $\alpha_{t+1}$ to obtain the optimized iterated motion vector field. The process continues until the preset stop condition is met.

Further, after the iteration is completed, based on each iterated base material decomposition image corresponding to the target iteration that meets the preset iteration stop condition, the target base material decomposition image corresponding to each iterated base material decomposition image is determined. The specific implementation can be obtained with reference to the description in step 202 above, and will not be repeated here.

In this embodiment, the reconstructed images corresponding to different base material decomposition images can be obtained simultaneously by iteration, i.e., multiple different types of reconstructed images are obtained, which greatly improves the efficiency of image reconstruction.

It should be understood that although the individual steps in the flowcharts involved in the embodiments as described above are shown in sequence as indicated by the arrows, these steps are not necessarily performed in sequence as indicated by the arrows. Except as expressly stated herein, there is no strict sequential limitation on the execution of these steps, and the steps may be executed in any other order. Moreover, at least some of the steps in the flowcharts involved in the embodiments described above may include multiple steps or multiple stages that are not necessarily performed at the same time, but may be performed at different times, and the order in which these steps or stages are performed is not necessarily sequential, but may be performed in sequence with other steps or at least a portion of steps or stages in other steps The order of execution of these steps or stages is not necessarily sequential, but can be performed alternately or alternatively with other steps or at least part of other steps.

Based on the same inventive concept, the embodiments of the present disclosure also provide an image reconstruction apparatus for implementing the above-mentioned method for image reconstruction. The solution for solving the problem provided by the apparatus is similar to the solution described in the above method, so that specific limitations in one or more embodiments of the image reconstruction apparatus provided below can be seen in the foregoing definition of the method for image reconstruction, which is not described again herein.

Figure 4:
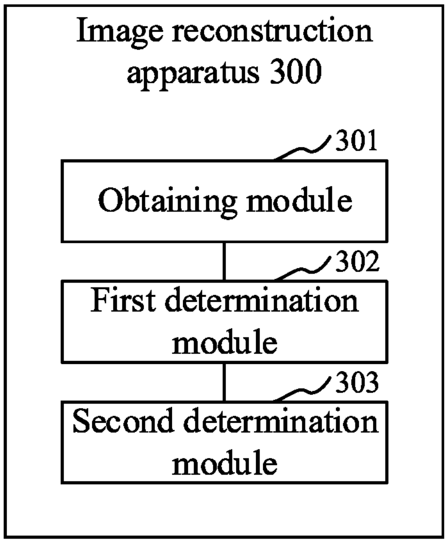
FIG. 4 is a block diagram of a structure of an image reconstruction apparatus according to an embodiment of the present disclosure.

In some embodiments, as shown in FIG. 4, there is provided an image reconstruction apparatus 300, including an obtaining module 301, a first determination module 302, and a second determination module 303.

The obtaining module 301 is configured for obtaining original scanning data of an object.

The first determining module 302 is configured for determining an initial reconstructed image and an initial motion vector field of the object based on the original scanning data.

The second determining module 303 is configured for determining a target reconstructed image of the object by a plurality of iterations based on the original scanning data, the initial reconstructed image, and the initial motion vector field.

An iterative result of at least one of the plurality of iterations is obtained based on a machine learning model.

In some embodiments, the second determination module 303 is specifically configured to perform the plurality of iterations on the initial reconstructed image and/or the initial motion vector field using energy functions until a preset iteration stop condition is met. Then, the target reconstructed image of the object is determined based on the iterated reconstructed image corresponding to the target iteration meeting the preset iteration stop condition. The iteration indicates that an iterated reconstructed image and/or an iterated motion vector field are determined by an energy function based on a starting reconstructed image and/or a starting motion vector field of the current iteration. This energy function is related to the original scanning data, the initial reconstructed image, and the initial motion vector field. The energy function for at least one of the plurality of iterations is constructed based on a machine learning model.

In some embodiments, the second determination module 303 is specifically configured for obtaining an iterated reconstructed image and an iterated motion vector field based on a starting reconstructed image and a starting motion vector field in a current iteration; or, obtaining an iterated reconstructed image based on a starting reconstructed image and a starting motion vector field in a current iteration, and obtaining an iterated motion vector field based on the iterated reconstructed image and the starting motion vector field; or, obtaining an iterated motion vector field based on a starting reconstructed image and a starting motion vector field in a current iteration, and obtaining an iterated reconstructed image based on the starting reconstructed image and the iterated motion vector field.

In some embodiments, the second determination module 303 is specifically configured for obtaining an iterated reconstructed image based on a starting reconstructed image and a starting motion vector field in a current iteration, or obtaining an iterated motion vector field based on a starting reconstructed image and a starting motion vector field in a current iteration.

In some embodiments, the preset iteration stop condition includes a preset number of iterations and/or a preset threshold. The preset threshold is related to at least one of a quality of the reconstructed image, a quality variation amount of the reconstructed image, a quality of the motion vector field, a quality variation amount of the motion vector field, or a value of the energy function.

In some embodiments, the energy function includes a data fidelity term and a regularization term. The regularization term includes at least one of a regularization term for a reconstructed image, a regularization term for a motion vector field, and a regularization term for a reconstructed image and a motion vector field. The reconstructed image is an initial reconstructed image or an iterated reconstructed image in each iteration, and the motion vector field is an initial motion vector field or an iterated motion vector field in each iteration.

The energy function constructed based on the machine learning model includes a data fidelity term and a regularization term based on the machine learning model.

In some embodiments, the data fidelity term is the correlation expression between the original scanning data and intermediate scanning data. The intermediate scanning data is the scanning data generated by image processing of the reconstructed image based on the motion vector field. Image processing includes image distortion processing and forward projection processing.

In some embodiments, the target reconstructed image is one of a CT image, an MR image, a PET image, and a PET-CT image.

Each module in the image reconstruction apparatus may be implemented in whole or in part by software, hardware, and combinations thereof. The above modules may be embedded in hardware or independently of the processor in the computer device, or may be stored in software in memory in the computer device to facilitate calling by the processor to perform operations corresponding to each of the above modules.

Figure 5:
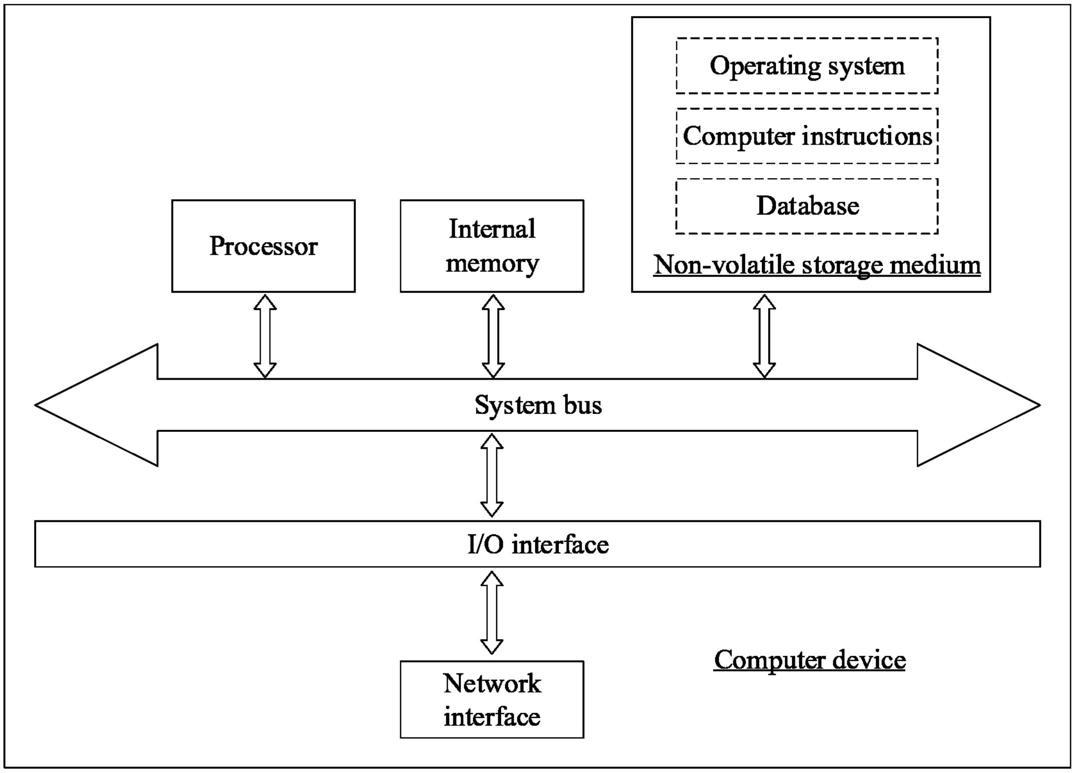
FIG. 5 is a diagram showing an internal structure of a computer device according to an embodiment of the present disclosure.

In some embodiments, there is provided a computer device, which may be a terminal or a server. The terminal or server may be a computer device in communication connection with a medical image scanning device, the internal structure of which is shown in FIG. 5. The computer device includes a processor, a memory, and a network interface connected via a system bus. The processor of the computer device is used to provide computing and control capabilities. The memory of the computer device includes a non-transitory storage medium and an internal memory. The non-transitory storage medium stores an operating system, computer programs, and a database. The internal memory provides an environment for running the operating system and the computer programs in the non-transitory storage medium. The database of the computer device can be used for storing the iterated reconstructed image and the iterated motion vector field after each iteration, and can also be used for storing the original scanning data of the scanned objects. The network interface of the computer device is used to communicate with external terminals through a network connection. The computer program is executed by the processor to implement a method for image reconstruction. Alternatively, the computer device may also include a display screen which may be a liquid crystal display screen or an electronic ink display screen, an input device of the computer device which may be a touch layer covered on the display screen, a key, a trackball or a touchpad disposed on the housing of the computer device, an external keyboard, a touchpad or a mouse, etc.

Those skilled in the art will understand that the structure shown in FIG. 5 is merely a block diagram of a portion of the structure associated with the solution of the present disclosure, and does not constitute a limitation to the computer device to which the solution of the present disclosure applies. A specific computer device may include more or less components than shown in the figure, or may combine certain components, or may have different component arrangements.

In some embodiments, a computer device is provided, which includes a memory and a processor. The memory stores a computer program therein. The processor, when executing the computer program, performs the steps of the method for image reconstruction in the various embodiments described above.

In some embodiments, a computer-readable storage medium is provided, in which a computer program is stored. The computer program, when executed by a processor, causes the processor to perform the steps of the method for image reconstruction in the various embodiments described above.

In some embodiments, a computer program product is provided, which includes a computer program. The computer program, when executed by a processor, causes the processor to perform the steps of the method for image reconstruction in the various embodiments described above.

It should be noted that the user information (including but not limited to user device information, user personal information, etc.) and data (including but not limited to data for analysis, stored data, displayed data, etc.) referred to in this disclosure are all information and data authorized by the user or fully authorized by all parties.

A person of ordinary skill in the art can understand that all or part of the processes in the methods of the above embodiments can be achieved by computer instructions instructing the relevant hardware to do so. The computer instructions can be stored in a non-transitory computer-readable storage medium, and when executed, perform the processes such as those of the methods of the embodiments described above. The memory, database, or other medium recited in the embodiments of the disclosure include at least one of non-transitory and transitory memory. Non-transitory memory includes read-only memory (ROM), magnetic tape, floppy disk, flash memory, optical memory, high density embedded non-transitory memory, resistive memory (ReRAM), magnetoresistive random access memory (MRAM), ferroelectric memory (FRAM), phase change memory (PCM), or graphene memory, etc. Transitory memory includes random access memory (RAM) or external cache memory, etc. For illustration rather than limitation, RAM may be in various forms, such as static random access memory (SRAM) or dynamic random access memory (DRAM), etc. The databases involved in the embodiments of the present disclosure may include at least one of a relational database and a non-relational database. The non-relational databases may include, without limitation, a blockchain-based distributed database, etc. The processors involved in the embodiments of the present application may be general purpose processors, central processing units, graphics processors, digital signal processors, programmable logicians, quantum computing based data processing logicians, etc., without limitation.

The technical features of the foregoing embodiments may be freely combined. For brevity, not all possible combinations of the technical features in the foregoing embodiments are described. However, the combinations of these technical features should be considered to be included within the scope of this disclosure, as long as the combinations are not contradictory.

The above described embodiments express only implementations of the present application, the descriptions of which are specific and detailed, but cannot be construed as a limitation of the scope of the present application. It is noted that for a person of ordinary skill in the art, variations and improvements can be made without departing from the concept of the present application, which all belong to the protection scope of the present application. Therefore, the protection scope of the present application shall be subject to the attached claims.

What is claimed:

1. A method for image reconstruction, comprising:

obtaining original scanning data of an object, the original scanning data being multi-energy spectrum CT scanning data;

obtaining an initial image and an initial motion vector field of the object, wherein the initial image comprises an initial reconstructed image, the initial reconstructed image and the initial motion vector field are determined based on the original scanning data, and the initial reconstructed image comprises a plurality of initial base material decomposition images reconstructed according to different reconstruction parameters; and determining a target reconstructed image of the object by a plurality of iterations based on the original scanning data, the initial reconstructed image and the initial motion vector field, the target reconstructed image comprising a plurality of target base material decomposition images, an iterative result of at least one of the plurality of iterations being obtained based on a machine learning model, wherein determining the target reconstructed image of the object by the plurality of iterations based on the original scanning data, the initial reconstructed image and the initial motion vector field comprises:

performing the plurality of iterations on the initial base material decomposition images and the initial motion vector field using energy functions until a preset iteration stop condition is met to determine the target base material decomposition images of the object, the energy function corresponding to the at least one of the plurality of iterations being constructed based on the machine learning model.

2. The method of claim 1, wherein the determining the target reconstructed image of the object by the plurality of iterations based on the original scanning data, the initial reconstructed image and the initial motion vector field further comprises:

determining the target reconstructed image of the object based on an iterated reconstructed image corresponding to a target iteration meeting the preset iteration stop condition.

3. The method of claim 2, wherein the plurality of iterations each comprise:

obtaining an iterated reconstructed image based on a starting reconstructed image and a starting motion vector field in a current iteration; and/or obtaining an iterated motion vector field based on a starting reconstructed image and a starting motion vector field in a current iteration.

4. The method of claim 2, wherein the plurality of iterations each comprise:

obtaining an iterated reconstructed image based on a starting reconstructed image and a starting motion vector field in a current iteration, and obtaining an iterated motion vector field based on the iterated reconstructed image and the starting motion vector field; or obtaining an iterated motion vector field based on a starting reconstructed image and a starting motion vector field in a current iteration, and obtaining an iterated reconstructed image based on the starting reconstructed image and the iterated motion vector field.

5. The method of claim 2, wherein the preset iteration stop condition comprises a preset number of iterations and/or a preset threshold, the preset threshold being related to at least one of a quality of the reconstructed image, a quality variation amount of the reconstructed image, a quality of the motion vector field, a quality variation amount of the motion vector field, or a value of the energy function.

6. The method of claim 1, wherein the energy functions each comprise a data fidelity term and a regularization term, the energy function constructed based on the machine learning model comprising the regularization term based on the machine learning model and the data fidelity term.

7. The method of claim 6, wherein the data fidelity term is a correlation expression between the original scanning data and intermediate scanning data, the intermediate scanning data being generated by image processing of the initial reconstructed image or the iterated reconstructed image in each iteration based on the motion vector field, the image processing comprising image distortion processing and forward projection processing.

8. The method of claim 6, wherein the regularization term comprises at least one of a regularization term for the initial reconstructed image or an iterated reconstructed image in the at least one iteration, a regularization term for the initial motion vector field or an iterated motion vector field in the at least one iteration, or a regularization term for the initial reconstructed image or the iterated reconstructed image in the at least one iteration and the corresponding motion vector field.

9. The method of claim 8, wherein the energy function is represented by the following equation:

$$E(U,M(\alpha))=\|Y-\mathrm{FP}(T(M)U)\|^2+R_1(U)+R_2(M(\alpha))+R_3(U,M(\alpha))$$

where $\|Y-\mathrm{FP}(T(M)U)\|^2$ is a data fidelity term of the energy function, $R_1(U)+R_2(M(\alpha))+R_3(U, M(\alpha))$ is a regularization term of the energy function, Y is an original scanning data of the object, U is an initial reconstructed image generated based on the original scanning data or the iterated reconstructed image in each iteration, $M(\alpha)$ is an initial motion vector field or the iterated motion vector field in each iteration, a is a parameter set for parameterizing the motion vector field, $R_1(U)$ is a regularization term for the reconstructed image, $R_2(M(\alpha))$ is a regularization term for the motion vector field, $R_3(U, M(\alpha))$ is a regularization term for the reconstructed image and the motion vector field, T(M) is an image warping operator based on the motion vector field, FP is a forward projection operator, and E is an energy function.

10. The method of claim 8, wherein the energy function is represented by the following equation:

$$E(U,M(\alpha))=\|Y-FP(T(M)U)\|^2+DL_1(U)+DL_2(M(\alpha))+DL_3(U,M(\alpha))$$

where $\|Y-FP(T(M)U)\|^2$ is a data fidelity term of the energy function, $DL_1(U)$ is a regularization term for the reconstructed image based on the machine learning model, $DL_2(M(\alpha))$ is a regularization term for the motion vector field based on the lachine learning model, $DL_3(U, M(\alpha))$ is a regularization term for the reconstructed image and the motion vector field based on the machine learning model.

11. The method of claim 1, wherein the target reconstructed image comprises one of a CT image, an MR image, a PET image, and a PET-CT image.

12. A computer device, comprises a memory and a processor, the memory including a computer program stored therein, wherein the processor, when executing the computer program, performs a method for image reconstruction, the method comprising:

obtaining original scanning data of an object, the original scanning data being multi-energy spectrum CT scanning data;

obtaining an initial image and an initial motion vector field of the object, wherein the initial image comprises an initial reconstructed image, the initial reconstructed image and the initial motion vector field are determined based on the original scanning data, and the initial reconstructed image comprises a plurality of initial base material decomposition images reconstructed according to different reconstruction parameters; and determining a target reconstructed image of the object by a plurality of iterations based on the original scanning data, the initial reconstructed image and the initial motion vector field, the target reconstructed image comprising a plurality of target base material decomposition images, an iterative result of at least one of the plurality of iterations being obtained based on a machine learning model, wherein determining the target reconstructed image of the object by the plurality of iterations based on the original scanning data, the initial reconstructed image and the initial motion vector field comprises:

performing the plurality of iterations on the initial base material decomposition images and the initial motion vector field using energy functions until a preset iteration stop condition is met to determine the target base material decomposition images of the object, the energy function corresponding to the at least one of the plurality of iterations being constructed based on the machine learning model.

13. The computer device of claim 12, wherein the determining the target reconstructed image of the object by the plurality of iterations based on the original scanning data, the initial reconstructed image and the initial motion vector field further comprises:

determining the target reconstructed image of the object based on an iterated reconstructed image corresponding to a target iteration meeting the preset iteration stop condition.

14. The computer device of claim 13, wherein the plurality of iterations each comprise:

obtaining an iterated reconstructed image based on a starting reconstructed image and a starting motion vector field in a current iteration, and obtaining an iterated motion vector field based on the iterated reconstructed image and the starting motion vector field; or obtaining an iterated motion vector field based on a starting reconstructed image and a starting motion vector field in a current iteration, and obtaining an iterated reconstructed image based on the starting reconstructed image and the iterated motion vector field.

15. The computer device of claim 12, wherein the energy functions each comprise a data fidelity term and a regularization term, the energy function constructed based on the machine learning model comprising the regularization term based on the machine learning model and the data fidelity term.

16. The computer device of claim 15, wherein the regularization term comprises at least one of a regularization term for the initial reconstructed image or an iterated reconstructed image in the at least one iteration, a regularization term for the initial motion vector field or an iterated motion vector field in the at least one iteration, or a regularization term for the initial reconstructed image or the iterated reconstructed image in the at least one iteration and the corresponding motion vector field.

17. The computer device of claim 16, wherein the energy function is represented by the following equation:

$$E(U,M(\alpha))=\|Y-FP(T(M)U)\|^2+DL_1(U)+DL_2(M(\alpha))+DL_3(U,M(\alpha))$$

where $\|Y-FP(T(M)U)\|^2$ is a data fidelity term of the energy function, $DL_1(U)$ is a regularization term for the reconstructed image based on the machine learning model, $DL_2(M(\alpha))$ is a regularization term for the motion vector field based on the lachine learning model, $DL_3(U, M(\alpha))$ is a regularization term for the reconstructed image and the motion vector field based on the machine learning model.

18. A non-transitory computer-readable storage medium having a computer program stored therein, wherein the computer program, when executed by a processor, causes the processor to perform a method for image reconstruction of claim 1.

* * * * *